US010337954B2

(12) United States Patent
Helwig et al.

(10) Patent No.: US 10,337,954 B2
(45) Date of Patent: Jul. 2, 2019

(54) VEHICLE HEADLAMP WITH LASER FOR ALIGNMENT OF PROJECTED BEAM PATTERN, AND METHOD

(71) Applicant: Ford Global Technologies, LLC, Dearborn, MI (US)

(72) Inventors: Stephen Kenneth Helwig, Farmington Hills, MI (US); David A. Brown, Plymouth, MI (US); Simon Howard Curwood, Canton, MI (US); Diane Marie LaHaie, Dearborn, MI (US); Matt W. Roosen, Memphis, MI (US); Brian Carroll, Brighton, MI (US); Ken Alan Ward, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 91 days.

(21) Appl. No.: 15/499,134

(22) Filed: Apr. 27, 2017

(65) Prior Publication Data

US 2018/0312103 A1    Nov. 1, 2018

(51) Int. Cl.
  *G01M 11/06* (2006.01)
  *B60Q 1/068* (2006.01)
  *F21S 41/19* (2018.01)

(52) U.S. Cl.
  CPC ........ *G01M 11/062* (2013.01); *G01M 11/064* (2013.01); *G01M 11/068* (2013.01); *B60Q 1/0683* (2013.01); *F21S 41/19* (2018.01)

(58) Field of Classification Search
  CPC .... G01M 11/067; G01M 11/62; G01M 11/06; G01B 7/31; G01B 11/27; G01B 5/25; B60Q 1/045; B60Q 1/06; F21S 41/143; F21S 41/16

USPC .......................................................... 33/288
  See application file for complete search history.

(56) References Cited

U.S. PATENT DOCUMENTS

| | | | | |
|---|---|---|---|---|
| 2,940,174 A | * | 6/1960 | Shoemaker | G01M 11/062 33/288 |
| 3,029,515 A | * | 4/1962 | Marteil | G01B 11/275 33/288 |
| 3,612,949 A | * | 10/1971 | Becraft | G01Q 5/00 33/286 |
| 3,788,747 A | * | 1/1974 | Rahme | G01M 11/062 33/645 |
| 4,634,275 A | | 1/1987 | Yoshida et al. | |
| 4,839,785 A | * | 6/1989 | Ohishi | B60Q 1/0041 362/418 |
| 5,078,490 A | | 1/1992 | Oldweiler et al. | |
| 5,113,320 A | * | 5/1992 | Haydu | B60Q 1/045 362/549 |

(Continued)

FOREIGN PATENT DOCUMENTS

DE    102013012227 A1    3/2014

*Primary Examiner* — Ismael Negron
(74) *Attorney, Agent, or Firm* — Vichit Chea; Price Heneveld LLP

(57) ABSTRACT

A vehicle headlamp includes a housing, at least one lamp located in the housing, at least one beam alignment light source positioned in the housing and configured to project an image to aid in alignment of the at least one lamp, and at least one beam alignment mechanism operably coupled to the housing and configured to adjust the direction of light from the at least one lamp based on an image projected by the beam alignment light source.

20 Claims, 10 Drawing Sheets

(56) References Cited

U.S. PATENT DOCUMENTS

| | | | |
|---|---|---|---|
| 5,209,558 A * | 5/1993 | Suzuki | B60Q 1/0683 |
| | | | 362/243 |
| 5,315,763 A * | 5/1994 | Wing | G01M 11/06 |
| | | | 33/288 |
| 5,379,104 A | 1/1995 | Takao | |
| 5,426,500 A | 6/1995 | Ohana | |
| 5,751,832 A | 5/1998 | Panter et al. | |
| 6,231,220 B1 * | 5/2001 | Shibuya | B60Q 1/06 |
| | | | 362/421 |
| 6,511,215 B2 * | 1/2003 | Hashigaya | B60Q 1/0041 |
| | | | 362/460 |
| 6,543,920 B2 * | 4/2003 | Fujinami | B60Q 1/0041 |
| | | | 362/517 |
| 6,698,914 B2 * | 3/2004 | Berne | B60Q 1/0064 |
| | | | 362/287 |
| 8,128,139 B2 * | 3/2012 | Stoffel | B60Q 1/0433 |
| | | | 293/117 |
| 2005/0041433 A1 | 2/2005 | Sayers | |
| 2018/0001814 A1 | 1/2018 | Salter et al. | |

\* cited by examiner

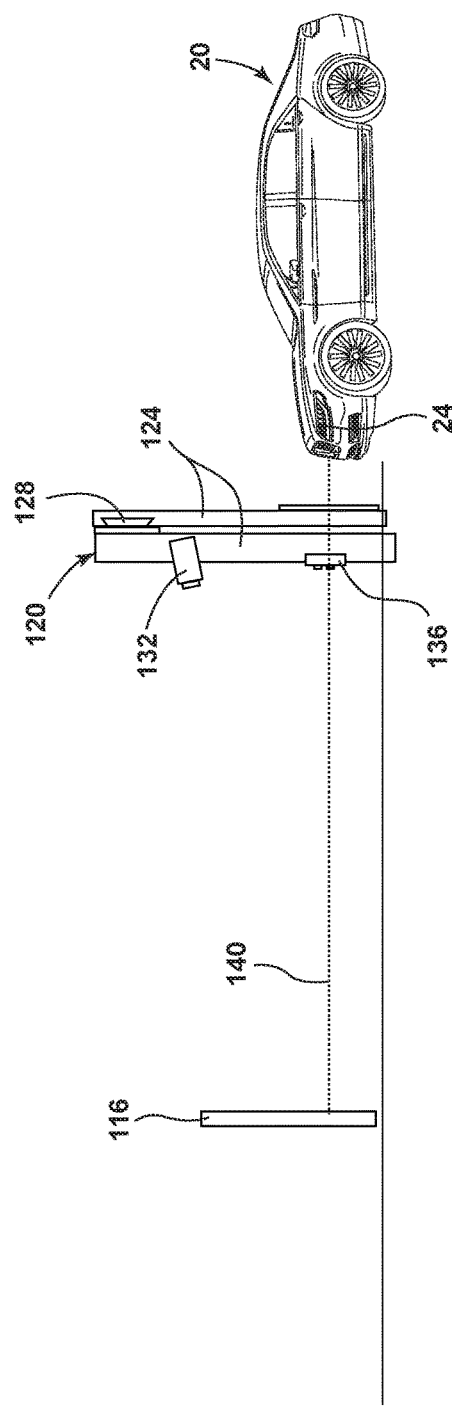
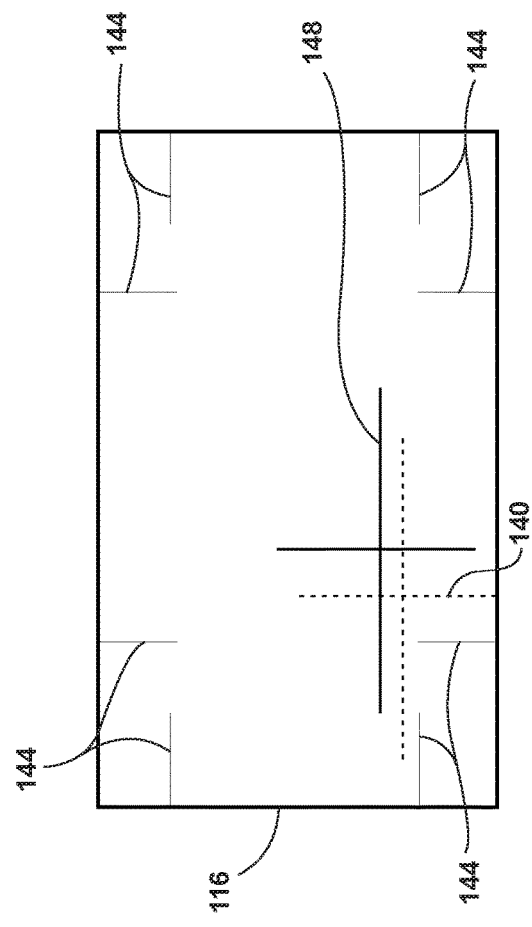
FIG. 9
FIG. 10

VEHICLE HEADLAMP WITH LASER FOR ALIGNMENT OF PROJECTED BEAM PATTERN, AND METHOD

FIELD OF THE DISCLOSURE

The present disclosure generally relates to beam alignment. More specifically, the present disclosure relates to headlamp beam alignment.

BACKGROUND OF THE INVENTION

Automobiles are equipped with vehicle headlamps. The vehicle headlamps are often adjustable to enable proper alignment of light emitted from the vehicle headlamp. Conventional vehicle headlamps can be time consuming to align. Additionally, the quality of the alignment can be subject to computer processing and/or human error.

SUMMARY OF THE INVENTION

According to a first aspect of the present disclosure, a vehicle headlamp includes a housing. One or more lamps are located in the housing. A beam alignment light source is positioned in the housing and is configured to aid in alignment of the one or more lamps. A beam alignment mechanism is operably coupled to the housing and configured to adjust the direction of light from at least one of the one or more lamps.

Embodiments of the first aspect of the present disclosure can include any one or a combination of the following features:
  the vehicle headlamp further includes a housing bezel positioned about a perimeter of the housing;
  the vehicle headlamp further includes a light source aperture in the housing positioned in-line with a travel path of light emitted from the alignment light source;
  the light source aperture is equipped with an image filter that interferes with at least some of the light emitted by the beam alignment light source;
  the image filter diffracts light emitted by the beam alignment light source such that a horizontal line and a vertical line are projected from the beam alignment light source; and
  the horizontal line and the vertical line cross near a mid-point of the horizontal and vertical lines such that a cross-hair is projected from the beam alignment light source.

According to a second aspect of the present disclosure, a vehicle headlamp includes a low-beam housing and one or more low-beam lamps. A low-beam alignment mechanism is operably coupled to the low-beam housing. A low-beam alignment light source is positioned in the low-beam housing. A low-beam housing bezel is positioned about a perimeter of the low-beam housing. A low-beam light source aperture in the low-beam housing is positioned in-line with a travel path of light emitted from the low-beam alignment light source.

Embodiments of the second aspect of the present disclosure can include any one or a combination of the following features:
  the low-beam light source aperture is in the low-beam bezel;
  the vehicle headlamp further includes a high-beam housing;
  the vehicle headlamp further includes a high-beam housing bezel positioned about a perimeter of the high-beam housing;
  the vehicle headlamp further includes a high-beam alignment mechanism operably coupled to the high-beam housing;
  the vehicle headlamp further includes a high-beam alignment light source positioned in the high-beam housing;
  the vehicle headlamp further includes a high-beam light source aperture in the high-beam housing positioned in-line with a travel path of light emitted from the high-beam alignment light source;
  the high-beam light source aperture is equipped with an image filter that interferes with at least some of the light emitted by the high-beam alignment light source;
  the image filter diffracts light emitted by the high-beam alignment light source such that a horizontal line and a vertical line are projected from the high-beam alignment light source; and
  the horizontal line and the vertical line cross near a mid-point of the horizontal and vertical lines such that a cross-hair is projected from the high-beam alignment light source.

According to a third aspect of the present disclosure, a method of aligning a vehicle headlamp includes the steps of: illuminating an alignment light source within the vehicle headlamp; projecting the illuminated alignment light source onto a surface; aligning the alignment light source to a pre-determined position on the surface; and adjusting one or more lamps to correspond with the pre-determined position of the alignment light source.

Embodiments of the third aspect of the present disclosure can include any one or a combination of the following features:
  the method of aligning a vehicle headlamp further includes the step of illuminating the one or more lamps;
  the method of aligning a vehicle headlamp further includes the step of utilizing an on-board vehicle camera to evaluate the alignment of the vehicle headlamp; and
  the illuminated alignment light source is projected through an image filter and the alignment light source is a laser.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 9 is a side view of vehicle and headlamp alignment hardware for aligning a vehicle headlamp;

FIG. 10 is a front view of a surface used to align the vehicle headlamp, according to one embodiment.

DETAILED DESCRIPTION OF THE PREFERRED EMBODIMENTS

Figure 1:
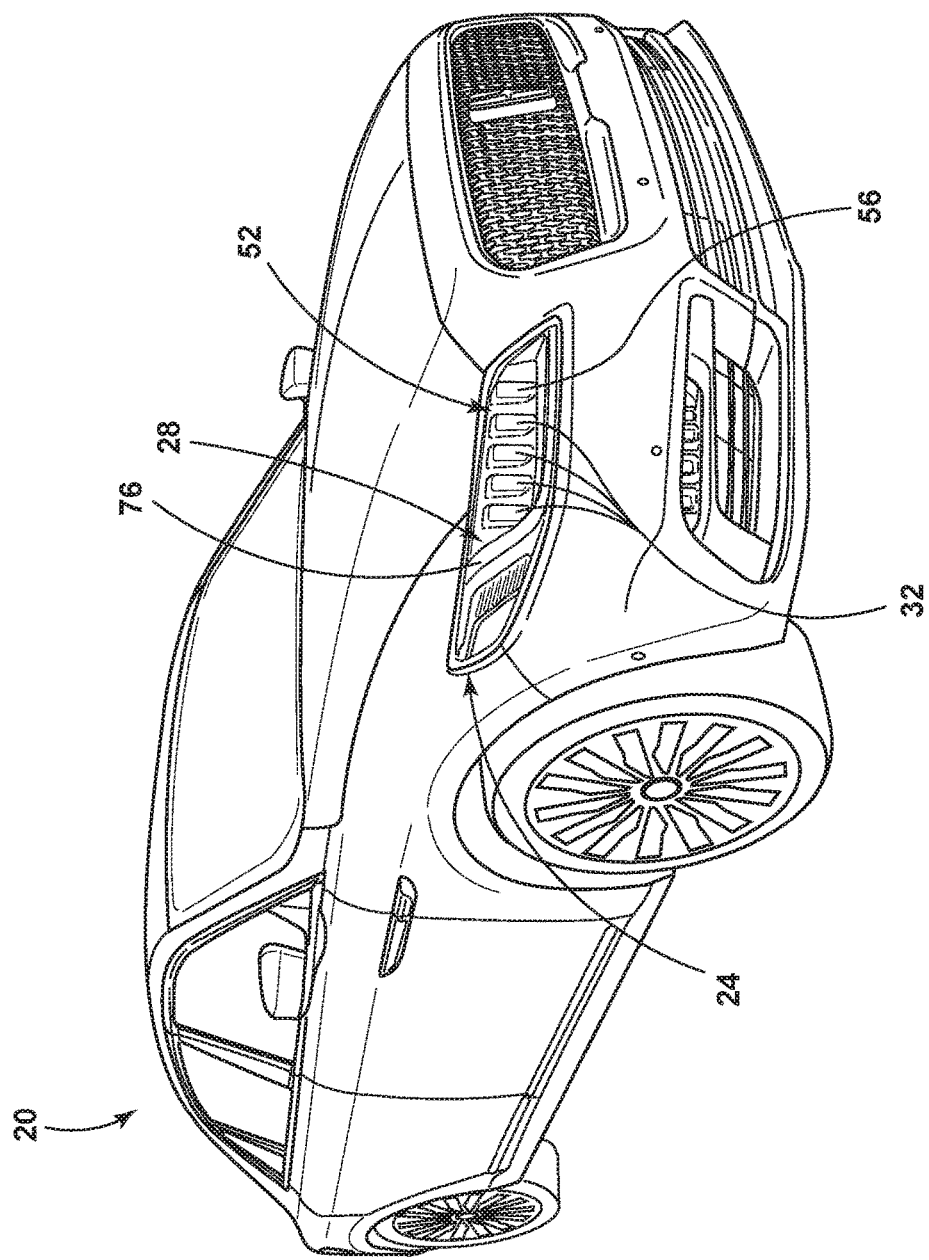
FIG. 1 is a front perspective view of a vehicle having headlamps that may be aligned with an alignment system and method.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle headlamp. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-10, a vehicle 20 is shown which typically includes one or more vehicle headlamps 24. The vehicle headlamp 24 may include a low-beam housing 28, one or more low-beam lamps 32, a low-beam alignment mechanism 36 that is operably coupled to the low-beam housing 28, a low-beam alignment light source 40 positioned in the low-beam housing 28, a low-beam housing bezel 44 positioned about a perimeter of the low-beam housing 28, and a low-beam light source aperture 48 in the low-beam housing 28 positioned in-line with a travel path of light emitted from the low-beam alignment light source 40.

The low-beam light source aperture 48 may alternatively be positioned in the low-beam housing bezel 44. The vehicle headlamp 24 may further include a high-beam housing 52, one or more high-beam lamps 56, a high-beam alignment mechanism 60 that is operably coupled to the high-beam housing 52, a high-beam alignment light source 64 positioned in the high-beam housing 52, a high-beam housing bezel 68 positioned about a perimeter of the high-beam housing 52, and a high-beam light source aperture 72 in the high-beam housing 52 positioned in-line with a travel path of light emitted from the high-beam alignment light source 72. The high-beam light source aperture 72 may alternatively be positioned in the high-beam housing bezel 68.

Referring again to FIGS. 1-10, the low-beam light source aperture 48 and/or the high-beam light source aperture 72 may further include an image filter 74. The image filter 74 is configured to interfere with at least some of the light emitted by the associated alignment light source (i.e. low-beam alignment light source 40 and/or high-beam alignment light source 64). The interference provided by the image filter 74 may be physically blocking light emitted by the associated alignment light source, diffract light emitted by the associated alignment light source (e.g. using diffraction gratings or materials), or the like. For example, the image filter 74 may diffract light emitted by the associated alignment light source such that a horizontal line and a vertical line are projected from the alignment light source. The horizontal and vertical lines may cross near a mid-point of the horizontal and vertical lines such that a cross-hair is projected from the alignment light source. In some embodiments, the image filter 74 may alternatively be operably coupled directly to the associated alignment light source.

Figure 2:
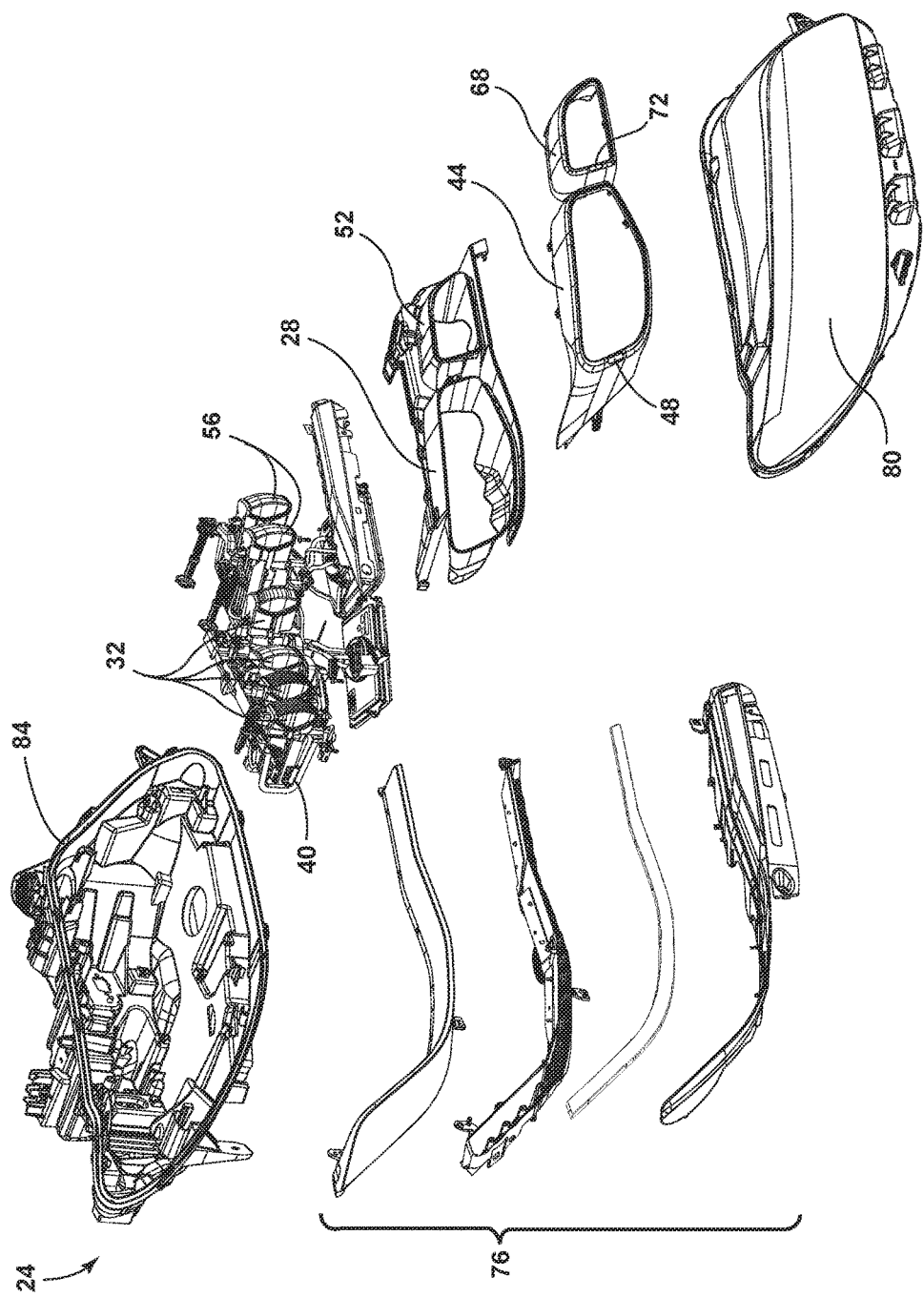
FIG. 2 is an exploded view of a vehicle headlamp, according to one embodiment.

Referring now to FIG. 2, the vehicle headlamp 24 includes the low-beam housing 28 and the high-beam housing 52. The low-beam lamps 32 and the high-beam lamps 56 are positioned within the low-beam housing 28 and the high-beam housing 52, respectively, when the vehicle headlamp 24 is in an assembled state. The low-beam housing bezel 44 and the high-beam housing bezel 68 operably couple to the low-beam housing 28 and the high-beam housing 52, respectively, and are positioned about a perimeter of the associated housings 28, 52. The vehicle headlamp 24 further includes a ribbon-like lamp assembly 76 that is positioned vertically below and outboard of the low-beam housing 28 and the high-beam housing 52. When in a fully assembled state a headlamp lens 80 represents a forward-most extreme of the vehicle headlamp 24. The headlamp lens 80 operably couples with a headlamp housing 84 such that the aforementioned headlamp components are fully contained within the vehicle headlamp 24 and sealed from the external environment in a water-tight fashion. The headlamp housing 84 represents a rearwardmost portion of the vehicle headlamp 24 when the vehicle headlamp 24 is fully assembled.

Figure 3:
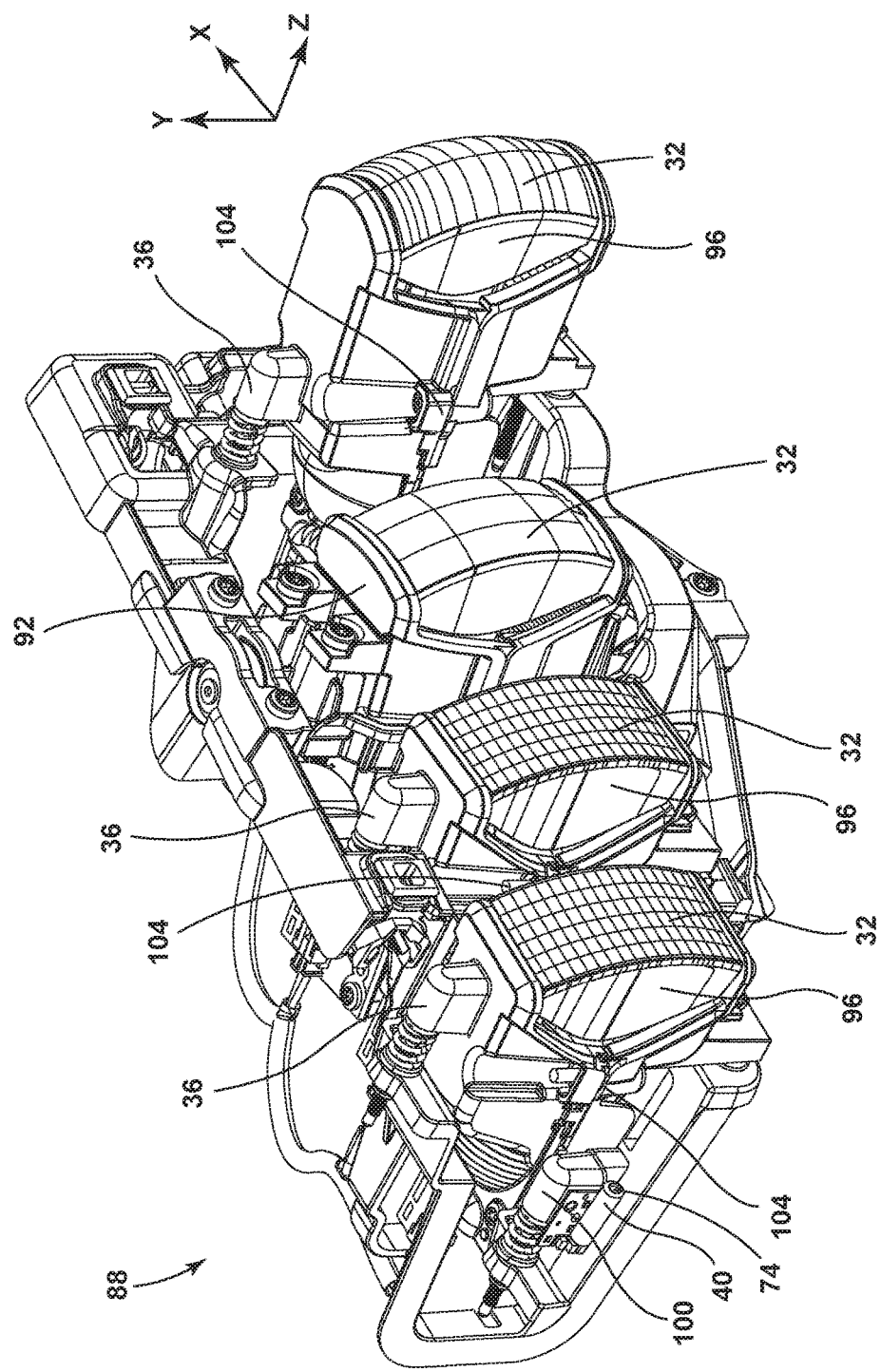
FIG. 3 is a top perspective view of a low-beam headlamp assembly.
Figure 4:
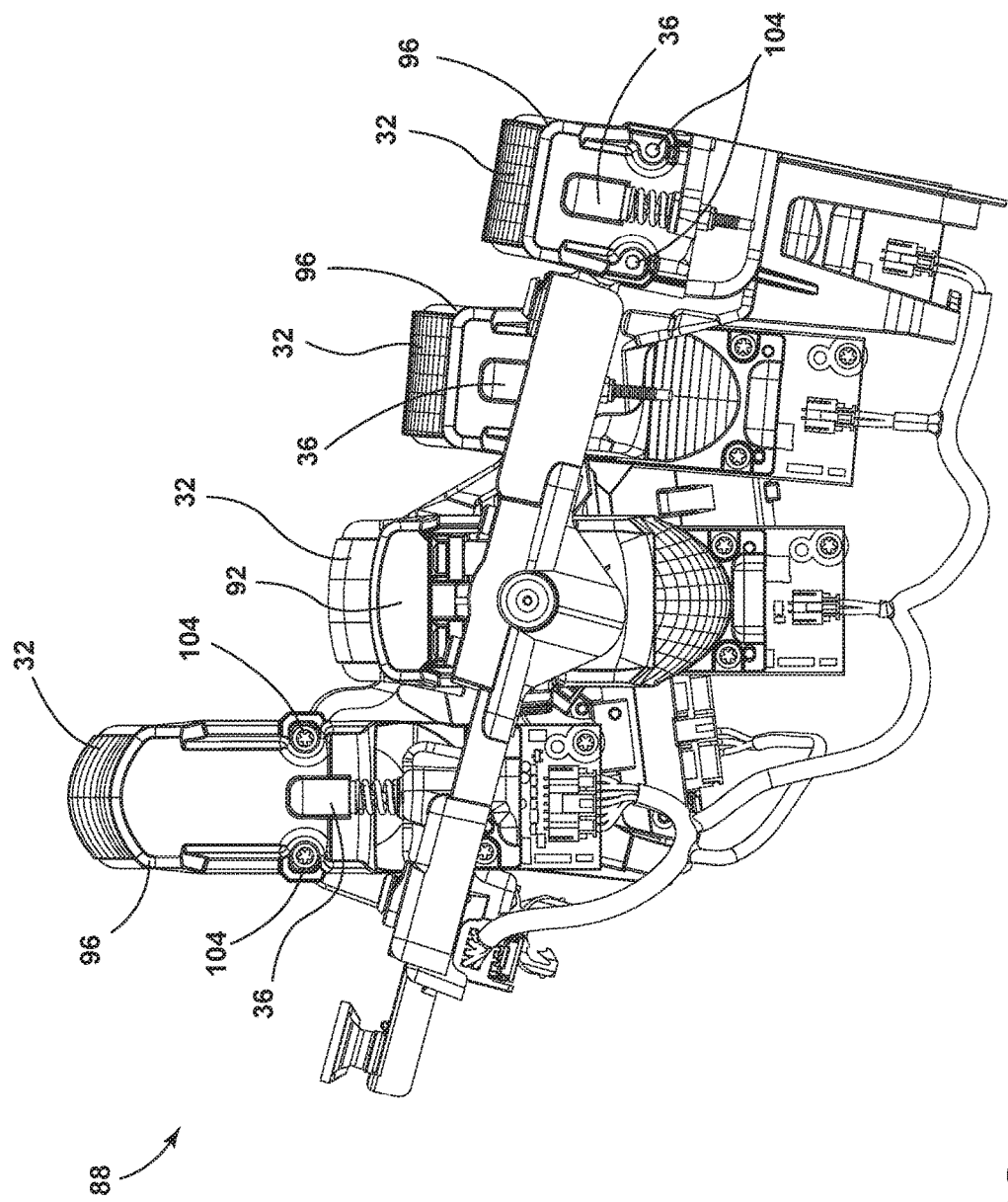
FIG. 4 is a top view of the low-beam headlamp assembly.
Figure 5:
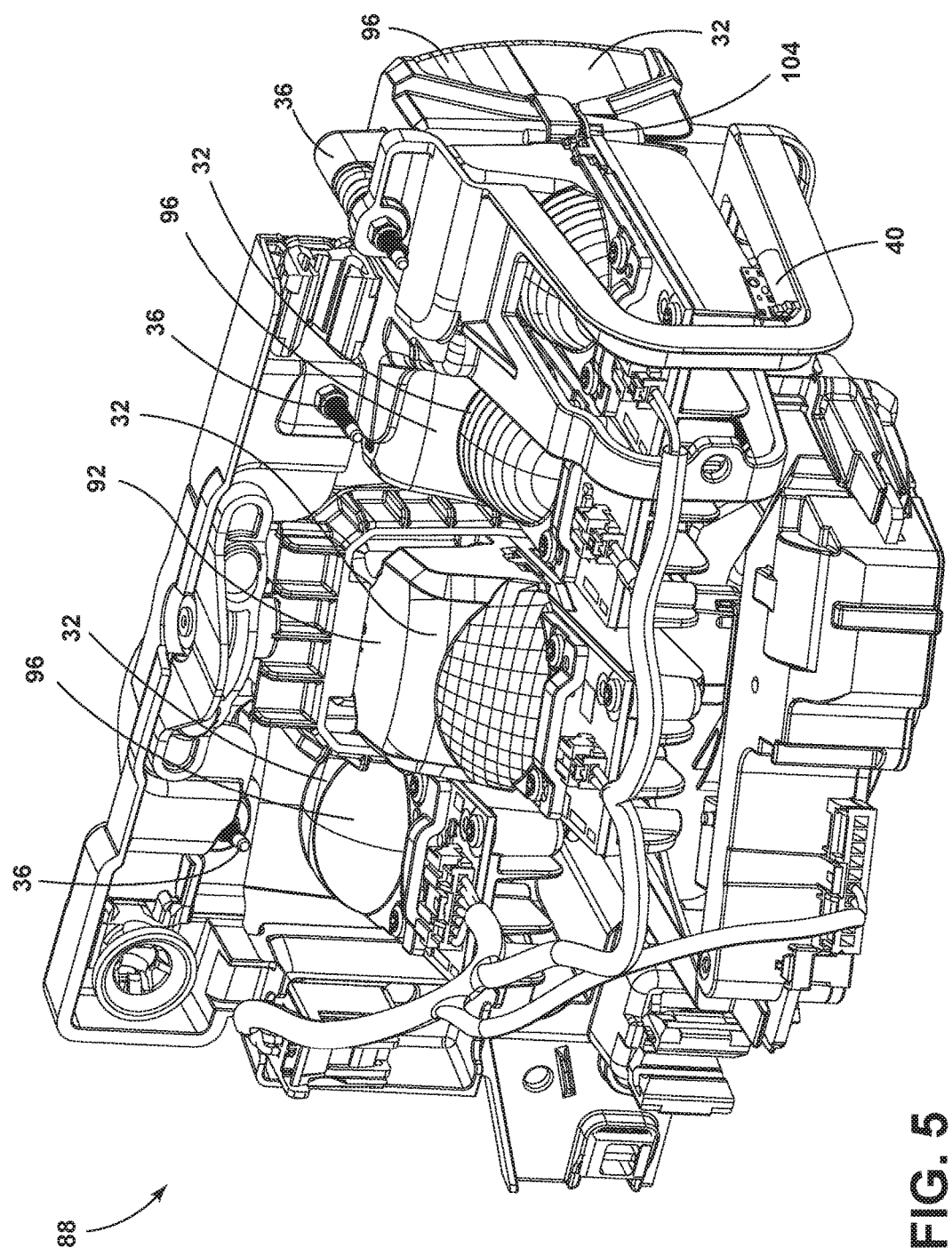
FIG. 5 is a rear view of the low-beam headlamp assembly.

Referring to FIGS. 3-5, the low-beam lamps 32 are operably coupled to one another within a low-beam lamp assembly 88. In the embodiment shown, one of the low-beam lamps 32 is not adjustable and serves as a primary low-beam lamp 92. The remaining low-beam lamps 32 are adjustable such that a beam pattern produced by the low-beam lamps 32 may be adjusted to coincide with the primary low-beam lamp 92. The low-beam lamps 32 that are not the primary low-beam lamp 92 may be referred to as secondary low-beam lamps 96. Each of the secondary low-beam lamps 96 is operably coupled to one of the low-beam alignment mechanisms 36. The low-beam alignment mechanisms 36 are capable of adjusting the associated low-beam lamp 32 in a horizontal direction and/or a vertical direction. The low-beam alignment light source 40 may be directly coupled to one of the low-beam lamps 32 (FIG. 5). Alternatively, the low-beam alignment light source 40 may be operably coupled to a light source alignment mechanism 100 (FIG. 3). The light source alignment mechanism 100 can adjust the direction of light emitted from the low-beam alignment light source 40 in a vertical and/or a horizontal direction. The light source alignment mechanism 100 may independently adjust the low-beam alignment light source 40. Alternatively, adjustments to the low-beam alignment light source 40 by the light source alignment mechanism 100) may be translated to the secondary low-beam lamps 96 such that aligning of the beam pattern of the vehicle headlamp 24 may be accomplished, at least in part, with the secondary low-beam lamps 96 and/or the primary low-beam lamp 92 turned off. In other words, rather than aligning the beam pattern of the vehicle headlamp 24, as emitted from the low-beam lamps 32, the low-beam alignment light source 40 may be aligned to a pre-determined position while the vehicle headlamp 24 is off and adjustments to the low-beam alignment light source 40 are transmitted to the low-beam lamps 32. The low-beam alignment light source 40 may be, for example, a laser (light amplification by stimulated emission of radiation), a light-emitting diode (LED), or the like. Adjustments to the secondary low-beam lamps 96 may be translated from the low-beam alignment mechanisms 36 to one or more pivot points 104 on the associated low-beam lamp 32. The pivot points 104 on a given secondary low-beam lamp 96 may be the pivot points 104 for horizontal and/or vertical motion of the secondary low-beam lamps 96. In other words, the pivot points 104 may be capable of pivotable motion in one or more planes (e.g., an X-Y plane, an X-Z plane, and/or a Y-Z plane).

Figure 6:
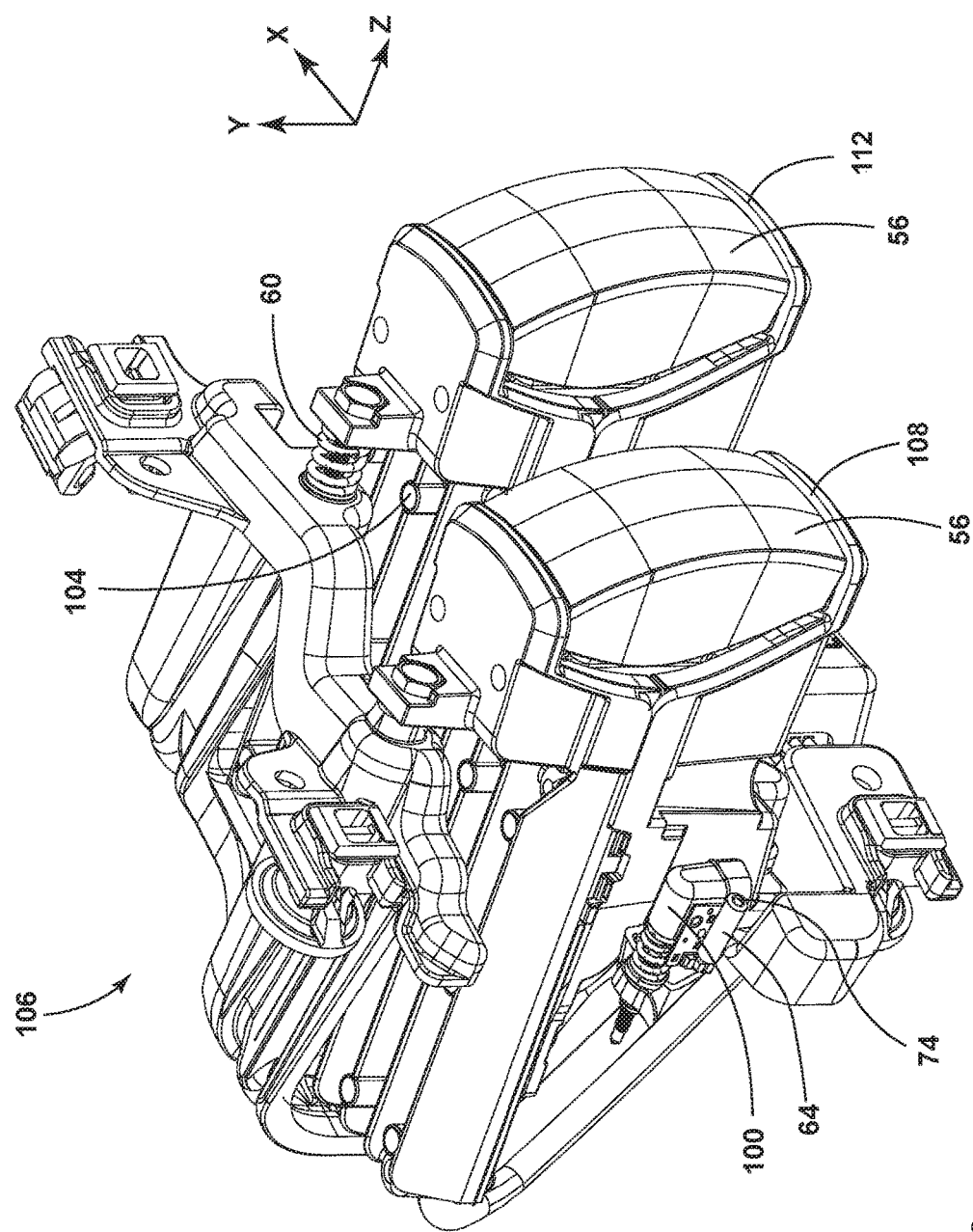
FIG. 6 is a top perspective view of a high-beam headlamp assembly.
Figure 7:
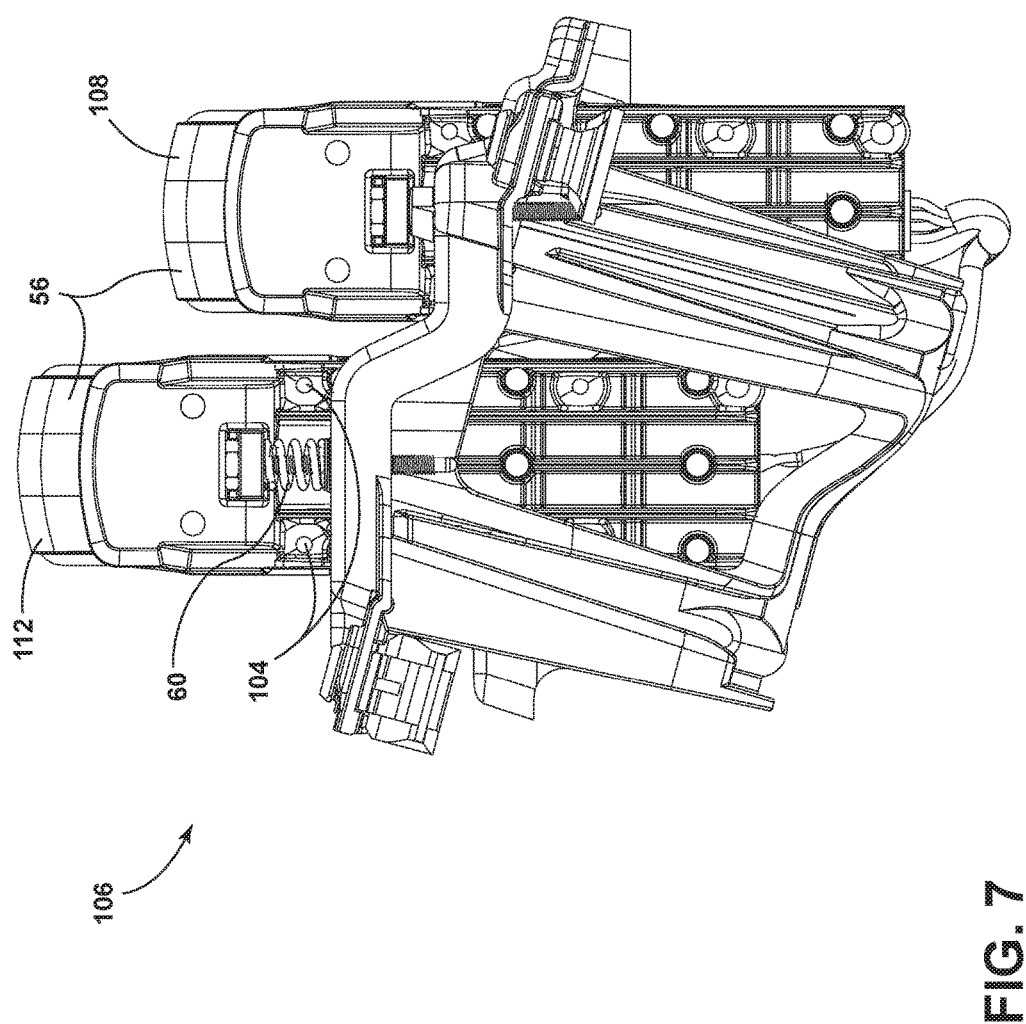
FIG. 7 is a top view of the high-beam headlamp assembly.
Figure 8:
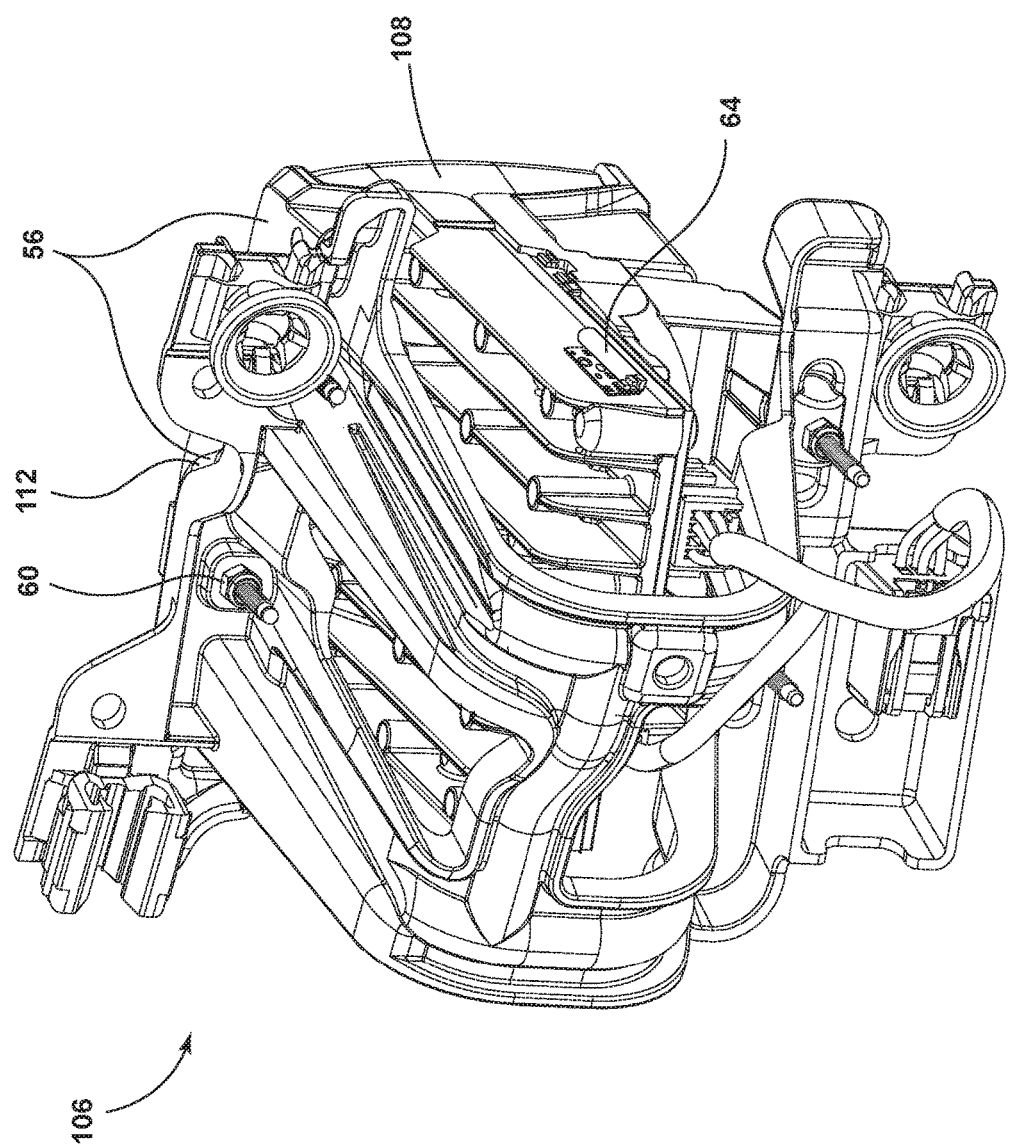
FIG. 8 is a rear view of the high-beam headlamp assembly.

Referring now to FIGS. 6-8, the high-beam lamps 56 are operably coupled to one another within a high-beam lamp assembly 106. The high-beam lamps 56 may be configured similarly to the low-beam lamps 32. More specifically, the high-beam lamps 56 may include a primary high-beam lamp 108 and one or more secondary high-beam lamps 112. In this embodiment, the primary high-beam lamp 108 is not adjustable while the secondary high-beam lamp 112 may be adjusted to correspond with the light pattern from the primary high-beam lamp 108. The secondary high-beam lamp 112 can be adjusted by the high-beam alignment mechanism 60. The adjustment of the secondary high-beam lamp 112 can be accomplished in a horizontal and/or vertical direction. The high-beam lamps 56 may include the high-beam alignment light source 64. The high-beam alignment light source 64 may be directly coupled to one of the high-beam lamps 56 (FIG. 8). Alternatively, the high-beam alignment light source 64 may be operably coupled with the light source alignment mechanism 100 (FIG. 6). Adjustments to the secondary high-beam lamp 112 may be translated from the high-beam alignment mechanism 60 to the one or more pivot points 104 on the associated high-beam lamp 56. The pivot points 104 on a given secondary high-beam lamp 112 may be the pivot points 104 for horizontal and/or vertical motion of the secondary high-beam lamp 112. In other words, the pivot points 104 may be capable of pivotable motion in one or more planes (e.g., an X-Y plane, an X-Z plane, and/or a Y-Z plane).

Referring to FIG. 9, the vehicle headlamp 24 of the vehicle 20 may be aligned by illuminating a surface 116 with the low-beam lamps 32 and/or the high-beam lamps 56. The surface 116 may be spaced a predetermined distance from a gantry 120. The gantry 120 may include vertical support beams 124 that are operably coupled to one another at an upper end by a horizontal support beam 128. The gantry 120 may further include a camera 132 that is operably coupled to one of the vertical support beams 1241 or the horizontal support beam 128. The gantry 120 may also include a control panel 136 that is operably coupled to one of the vertical support beams 124. To align the beam pattern of the vehicle headlamp 214, the vehicle 20 approaches or is parked near the gantry 120 and the surface 116 is illuminated by the vehicle headlamp 24. The camera 132 monitors the surface 116 and would typically evaluate the beam pattern created by the vehicle headlamp 24. However, in the present disclosure rather than evaluating and/or processing the beam pattern produced by the vehicle headlamp 24, a projected pattern 140 from the low-beam alignment light source 40 and/or the high-beam alignment light source 64 is monitored by the camera 132. Additional features which may be integral to the vehicle 20, provided by the gantry 120, or otherwise available during the alignment process for the vehicle headlamp 24 include detecting or calculating a height of the vehicle headlamp 24 above the ground and detecting or calculating an angular orientation of the vehicle 20 relative to the surface 116 and/or the gantry 120.

Referring now to FIG. 10, the surface 116 may include one or more calibration marks 144 that are utilized by the camera 132 such that the camera 132 may automatically calibrate itself prior to, during, and/or after each use. The vehicle 20 (FIG. 9) may be placed in an AIM mode via the control panel 136 on the gantry 120 (FIG. 9) or via a graphical user interface (GUI) located in the vehicle 20. Placing the vehicle 20 in the AIM mode automatically illuminates the low-beam alignment light source 40 and/or the high-beam alignment light source 64. Next, the projected pattern 140 is illuminated on the surface 116 and monitored by the camera 132. The camera 132 monitors the position of the projected pattern 140 relative to a target location 148. The target location 148 represents a calculated target position for the beam pattern of the vehicle headlamp 24 based upon the specific height of the vehicle headlamp 24 above the ground and the angular orientation of the vehicle 20. The target location 148 may be projected by the gantry 120 or the camera 132. Alternatively, the target location 148 may be referenced as an internal target position for the camera 132 without projecting the target location 148 upon the surface 116. The gantry 120 may be operably coupled to the vehicle headlamps 24 and adjust the positioning of the beam pattern produced by the vehicle headlamps 24 by referencing the camera 132, the projected pattern 140, and the target location 148. The gantry 120 may then adjust the vehicle headlamp 24 such that the projected pattern 140 overlaps with the target location 148 to a substantial extent, for example, greater than 80% surface area overlap, greater than 85% surface area overlap, greater than 90% surface area overlap, or greater than 95% surface area overlap. Alternatively, a technician may manually adjust the vehicle headlamp 24 by referencing the projected pattern 140 and the target location 148. The adjustments to the vehicle headlamp 24 may be made solely at the light source alignment mechanism 100 of each vehicle headlamp 24. The adjustments to the light source alignment mechanism 100 may be automatically transmitted to the low-beam lamps 32 and/or the high-beam lamps 56. Alternatively, the low-beam alignment mechanism 36, the high-beam alignment mechanism 60, and the light source alignment mechanism 100 may be operated independent of one another.

Figure 11:
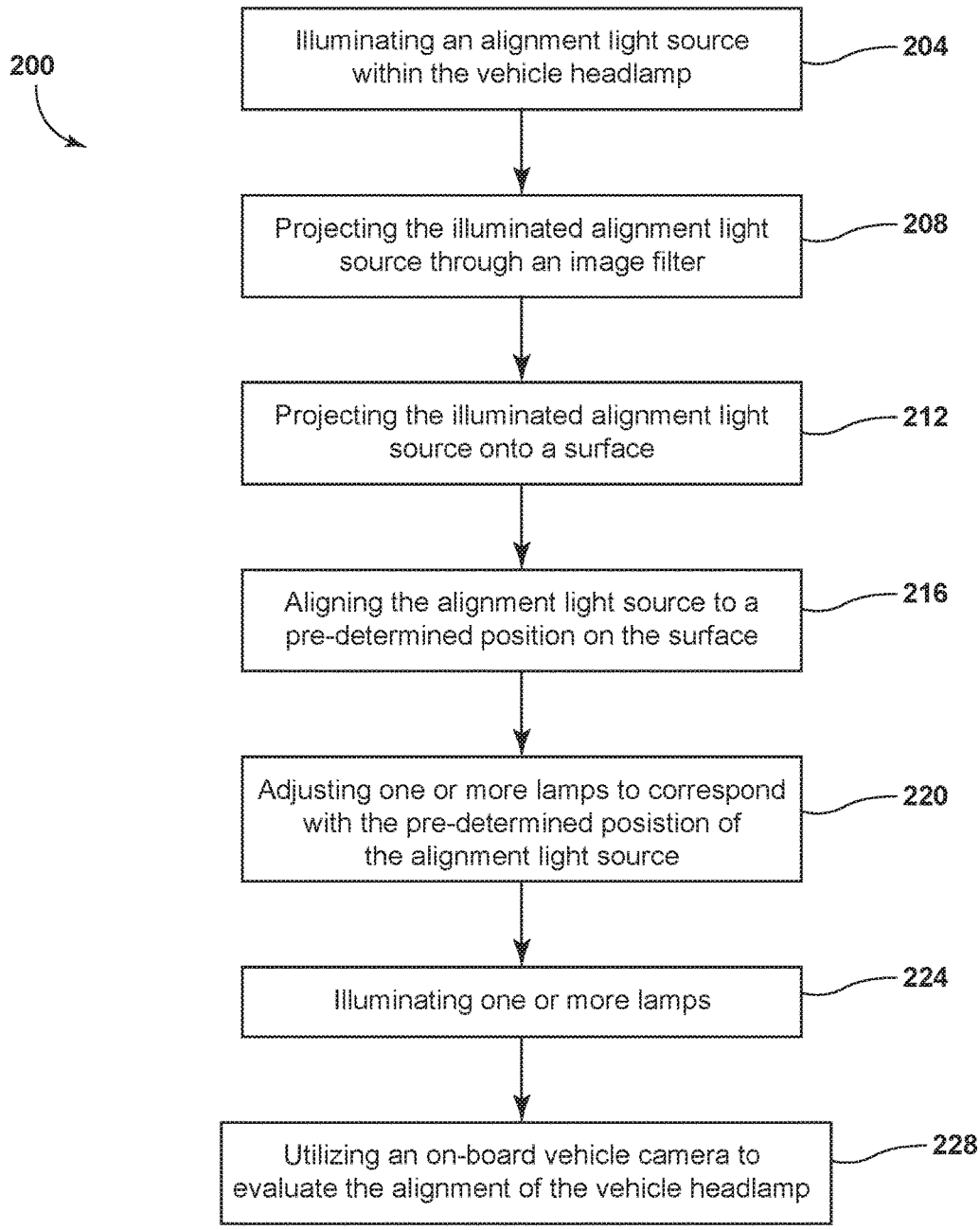
FIG. 11 is a flow chart of a method of aligning a vehicle headlamp.

Referring to FIG. 11, a method 200 of aligning the vehicle headlamp 24 includes step 204 of illuminating an alignment light source (e.g. low-beam alignment light source 40 or high-beam alignment light source 64). Next, the method 200 may include step 208 of projecting the illuminated light source through the image filter 74. Next, step 212 projects the illuminated alignment light source onto the surface 116. At step 216 the alignment light source is aligned to a pre-determined position on the surface 116, such as the target location 148. Next, step 220 adjusts one or more lamps (e.g. low-beam lamps 32 or high-beam lamps 56) to correspond with the pre-determined position of the alignment light source. Next, the method 200 may include step 224 where the one or more lamps are illuminated. Method 200 may terminate with step 228 of utilizing an on-board vehicle camera to evaluate the alignment of the vehicle headlamp 24. Alternatively, method 200 may terminate with a step where the alignment of the vehicle headlamp 24 is evaluated by a camera that is not on-board the vehicle 20, for example, the camera 132 on the gantry 120.

Conventional vehicle headlamps can be time consuming to align and rely heavily on the skill and judgement of a technician aligning the headlamp. The alignment of conventional vehicle headlamps often further relies upon processing of the beam pattern of the vehicle headlamp by software to determine the alignment of the headlamp. Accordingly, the quality of the alignment can be subject to computer processing and/or human error.

The vehicle headlamp provided herein utilizes the low-beam alignment light source 40 and/or the high-beam alignment light source 64 to align the beam pattern of the vehicle headlamp 24. Utilizing the low- and/or high-beam alignment light sources 40, 64 provides a more accurate and intuitive alignment of the beam patter of the vehicle headlamp 24 that is less prone to computer processing and/or human error. While the low-beam lamps 32 and the high-beam lamps 56 are shown as each having an associated alignment light source 40, 64 it is contemplated that the vehicle headlamp 24 may be alternatively configured. For example, the vehicle headlamp 24 may be equipped with a single alignment light source that is positioned proximal the low-beam lamps 32 or the high-beam lamps 56. In such an example, the single alignment light source may be operably coupled to both the low-beam lamps 32 and the high-beam lamps 56 such that alterations in the vertical and/or horizontal directions that are made to the alignment light source are translated to corresponding alterations in both the low-beam lamps 32 and the high-beam lamps 56. In other words, the single alignment light source may be utilized to align the beam pattern from both the low-beam lamps 32 and the high-beam lamps 56 simultaneously.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle headlamp comprising:
   a housing;
   one or more lamps located in the housing;
   a beam alignment light source positioned in the housing and configured to aid in alignment of the one or more lamps;
   a light source aperture positioned in-line with a travel path of light emitted from the beam alignment light source, the light source aperture equipped with an image filter; and
   a beam alignment mechanism operably coupled to the housing and configured to adjust the direction of light from at least one of the one or more lamps.

2. The vehicle headlamp of claim 1, further comprising:
   a housing bezel positioned about a perimeter of the housing.

3. The vehicle headlamp of claim 1, wherein the beam alignment light source is a laser.

4. The vehicle headlamp of claim 1, wherein the image filter interferes with at least some of the light emitted by the beam alignment light source.

5. The vehicle headlamp of claim 4, wherein the image filter diffracts light emitted by the beam alignment light source such that a horizontal line and a vertical line are projected from the beam alignment light source.

6. The vehicle headlamp of claim 5, wherein the horizontal line and the vertical line cross near a mid-point of the horizontal and vertical lines such that a cross-hair is projected from the beam alignment light source.

7. A vehicle headlamp comprising:
 a low-beam housing;
 one or more low-beam lamps;
 one or more high-beam lamps;
 a low-beam alignment mechanism operably coupled to the low-beam housing;
 a low-beam alignment light source positioned in the low-beam housing;
 a low-beam housing bezel positioned about a perimeter of the low-beam housing; and
 a low-beam alignment light source aperture in the low-beam housing positioned in-line with a travel path of light emitted from the low-beam alignment light source.

8. The vehicle headlamp of claim 7, wherein the low-beam light source aperture is in the low-beam housing bezel.

9. The vehicle headlamp of claim 7, further comprising:
 a high-beam housing.

10. The vehicle headlamp of claim 9, further comprising:
 a high-beam housing bezel positioned about a perimeter of the high-beam housing.

11. The vehicle headlamp of claim 10, further comprising:
 a high-beam alignment mechanism operably coupled to the high-beam housing.

12. The vehicle headlamp of claim 11, further comprising:
 a high-beam alignment light source positioned in the high-beam housing.

13. The vehicle headlamp of claim 12, further comprising:
 a high-beam light source aperture in the high-beam housing positioned in-line with a travel path of light emitted from the high-beam alignment light source.

14. The vehicle headlamp of claim 13, wherein the high-beam light source aperture is equipped with an image filter that interferes with at least some of the light emitted by the high-beam alignment light source.

15. The vehicle headlamp of claim 14, wherein the image filter diffracts light emitted by the high-beam alignment light source such that a horizontal line and a vertical line are projected from the high-beam alignment light source.

16. The vehicle headlamp of claim 15, wherein the horizontal line and the vertical line cross near a mid-point of the horizontal and vertical lines such that a cross-hair is projected from the high-beam alignment light source.

17. A method of aligning a vehicle headlamp comprising the steps of:
 illuminating an alignment light source within the vehicle headlamp;
 projecting the illuminated alignment light source onto a surface;
 aligning the alignment light source to a pre-determined position on the surface;
 adjusting one or more lamps to correspond with the pre-determined position of the alignment light source; and
 utilizing an on-board vehicle camera to evaluate the alignment of the vehicle headlamp.

18. The method of aligning a vehicle headlamp of claim 17, further comprising the step of:
 illuminating the one or more lamps after the step of aligning the alignment light source to a pre-determined position on the surface has been completed.

19. The method of aligning a vehicle headlamp of claim 17, wherein the step of projecting the illuminated alignment light source onto a surface further comprises:
 projecting the illuminated alignment light source through an image filter, wherein the illuminated alignment light source is a laser.

20. The method of aligning a vehicle headlamp of claim 17, wherein manipulation of the alignment light source is translated into simultaneous manipulation of the one or more lamps such that the step of aligning the alignment light source to a pre-determined position on the surface and the step of adjusting one or more lamps to correspond with the pre-determined position of the alignment light source are performed simultaneously.

* * * * *